Oct. 24, 1950  R. A. GOEPFRICH ET AL  2,527,126
BRAKE
Filed June 14, 1946  5 Sheets-Sheet 1

INVENTOR
RUDOLPH A. GOEPFRICH.
BRYAN E. HOUSE.
BY T. J. Plante
ATTORNEY

Oct. 24, 1950 R. A. GOEPFRICH ET AL 2,527,126
BRAKE

Filed June 14, 1946 5 Sheets-Sheet 4

INVENTOR.
RUDOLPH A. GOEPFRICH.
BRYAN E. HOUSE
BY T. J. Plante
ATTORNEY.

Oct. 24, 1950 R. A. GOEPFRICH ET AL 2,527,126
BRAKE
Filed June 14, 1946 5 Sheets-Sheet 5

Fig. 9.

INVENTOR
RUDOLPH A. GOEPFRICH.
BRYAN E. HOUSE.
BY T. C. Plante
ATTORNEY.

Patented Oct. 24, 1950

2,527,126

UNITED STATES PATENT OFFICE 2,527,126

BRAKE

Rudolph A. Goepfrich and Bryan E. House, South Bend, Ind.

Application June 14, 1946, Serial No. 676,736

12 Claims. (Cl. 188—78)

This invention relates to brakes, and particularly to the actuating means provided for spreading the shoes of an internally-expanding, drum-type brake.

An object of the present invention is to provide novel and improved means for exerting actuating force against the shoes in a brake of the type having two shoes which are individually shiftable to anchor at either end depending upon the direction of drum rotation. The novel shoe actuating means comprises two separate fluid pressure actuators each of which acts on the adjacent shoe ends through a member having a wedge-shaped shoe spreading surface.

A further object of the present invention is to provide a brake having the features discussed in the preceding paragraph, and further having the anchoring and applying forces acting substantially in the plane of the brake support plate.

Another object of the present invention is to provide an improved brake actuator having a mechanical shoe spreading device and a fluid pressure cylinder combined in a single, or unitary, construction, the parts of which can be directly secured together or integrated in the brake assembly.

Yet another object of the present invention is to provide a brake actuator having a wedge-shaped thrust-transmitting member which is readily removable from the actuator and which can be replaced with a thrust-transmitting member having a wedge of different effective angle, thereby changing the operating characteristics of the brake.

Still further features of the present invention include (a) the provision of novel means for permitting lateral movement of the wedge in order to compensate for unequal displacement of the adjacent shoe ends; (b) the provision of improved means for lubricating the mechanical parts of the actuator; (c) the provision of novel guiding means for the wedge-shaped thrust-transmitting member; and (d) the utilization of a single return spring to retract both the piston of the fluid pressure cylinder and the wedge-shaped thrust-transmitting member.

Other objects, features and advantages of the present invention will become apparent during the course of the following description, reference being had therein to the accompanying drawings, in which.

Figure 1:
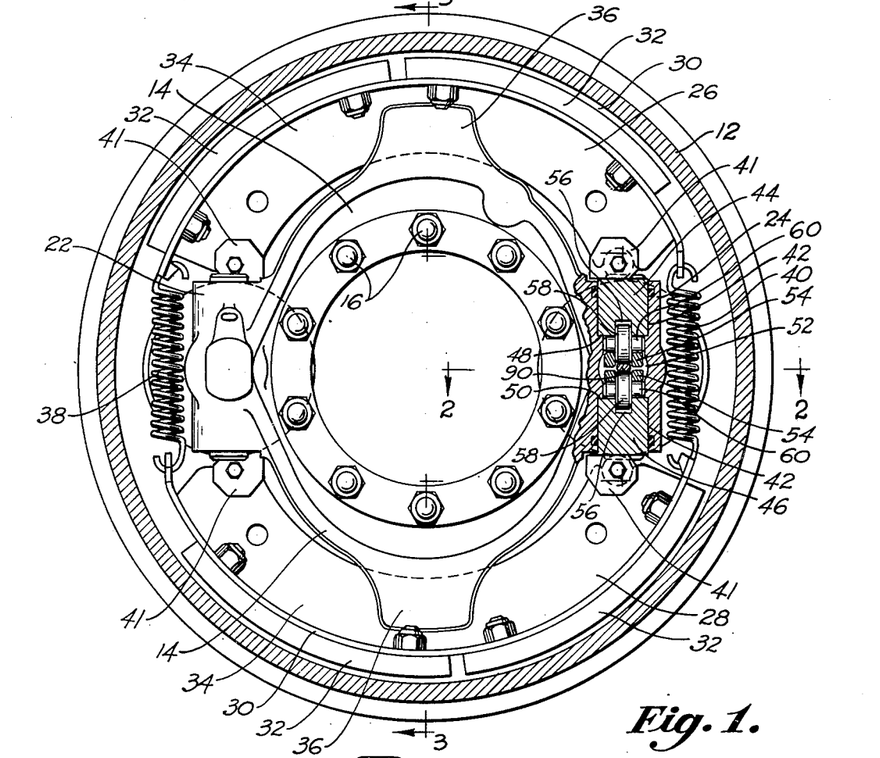
Figure 1 is a side elevation showing a brake assembly which incorporates our invention, certain portions of the brake assembly being shown in section.
Figure 2:
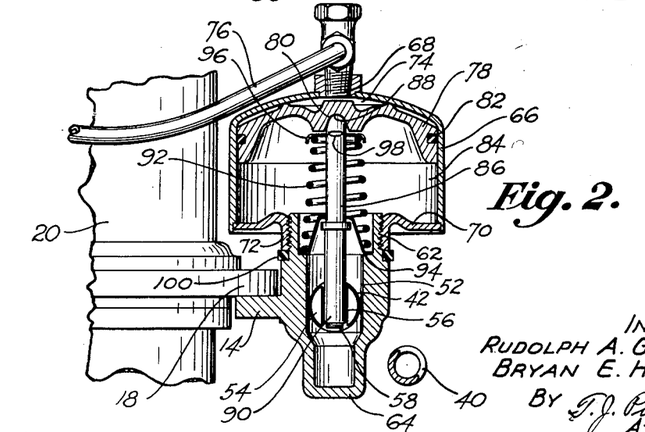
Figures 2 and 3 are enlarged sections taken on the lines 2—2 and 3—3, respectively, of Figure 1.
Figure 3:
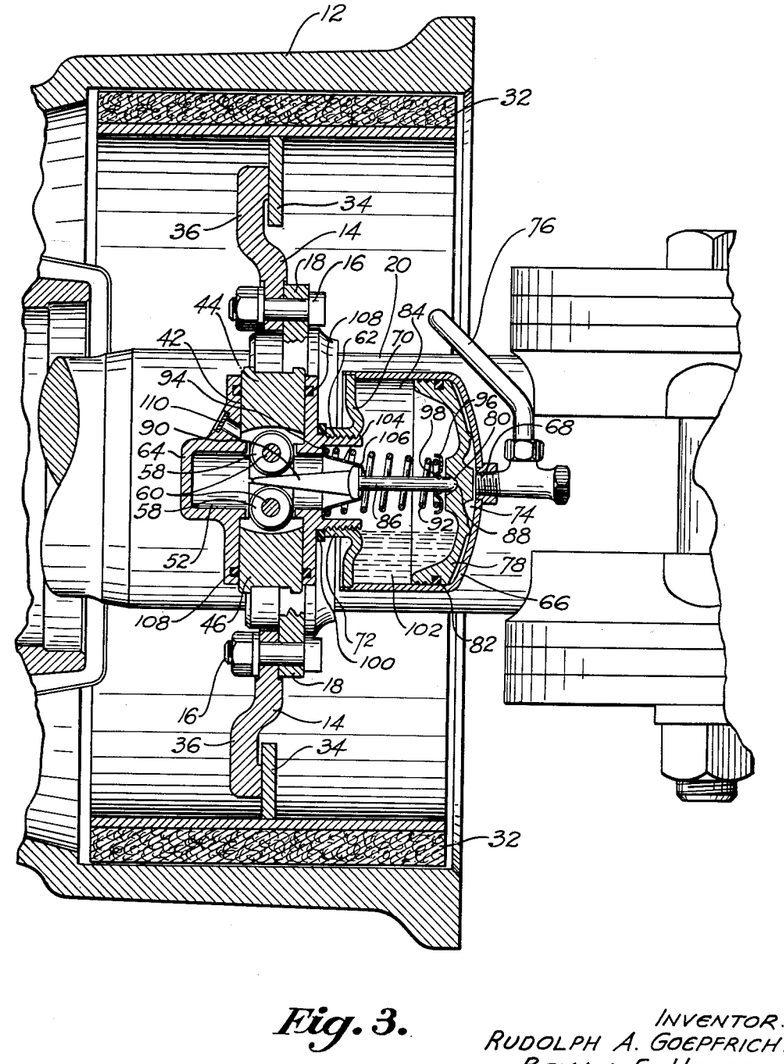

The brake shown in Figures 1 to 3 has the usual rotatable brake drum, the cylindrical braking flange 12 of the drum being shown in section. The non-rotatable components of the brake are mounted on a support member, or supporting plate 14, which is secured by means of a plurality of bolts 16 to the flange 18 provided on axle housing 20.

Although the supporting member 14 may be formed by stamping or forging, the illustrated version of it is a casting. One reason for manufacturing the support member 14 as a casting is to permit the casings 22 and 24 to be formed as integral parts of the casting, thus avoiding the necessity for securing separately formed casings to the support member. The casings 22 and 24 serve as housings for certain parts of the shoe actuating mechanism, which will hereinafter be described.

Two T-section brake shoes 26 and 28 are provided, each of which is individually shiftable to anchor at either end depending upon the direction of drum rotation at the time the shoes are brought into engagement with the drum. In other words, each end of each shoe constitutes the "toe," or applied, end of the shoe in one direction of drum rotation, and the "heel," or anchored, end of the shoe in the other direction of drum rotation.

Each of the shoes has a rim portion 30 to which are secured lining segments 32, and a strengthening web portion 34 which is perpendicular to the rim.

In order to avoid offset loading of the supporting plate 14, we prefer to centralize the shoes axially with respect to said supporting plate, or in other words, we prefer to locate the webs 34 of the shoes in the plane of the flat center portion of the support member. This relationship can be seen in Figure 3.

The shoes 26 and 28 are guided laterally by contact of the shoe webs 34 with surfaces provided on offset radial arms 36 of the support member 14 (as shown in Figure 3). In order to retain the shoes in position against the guide arms 36, the return springs 38 and 40, which are hooked to the shoe rims to urge the shoes toward retracted position, are offset laterally, or axially, from the plane of the shoe webs in such a way that the lines of force of the springs are located on the opposite side of the guide arms 36 from the webs of the shoes. This arrangement is more fully described in Goepfrich and House application Serial Number 663,084, filed April 18, 1946, Patent No. 2,502,948, April 4, 1950.

Adjustment of the released position of the brake shoes to compensate for lining wear may be provided by a plurality of adjustors 41 having the shapes of irregular polygons, similar to those disclosed in Goepfrich and House application Serial No. 502,858, filed September 18, 1943, Patent No. 2,243,015, June 24, 1947.

The actuating mechanisms, which are of primary importance to the present invention, include, as mentioned above, casings, or housings, 22 and 24 which are carried by the support member 14 (although in the illustrated embodiment of the invention the casings 22 and 24 are formed as integral parts of the casting which provides the support member, it would be equally feasible to form the casings 22 and 24 separately and secure them to the support member).

The actuating devices, which are located at opposite sides of the brake assembly, are substantially identical in construction and therefore the following description of one of the actuating devices is equally applicable to the other. Incidentally, in referring to the actuating devices as being located at opposite sides of the brake assembly, it is not meant to imply that they need be positioned at the left and right sides of the brake, as shown. They could equally well be located at the upper and lower sides of the brake assembly or in any desired position with respect to the vertical and horizontal.

Each actuating device has a tangentially extending bore 42, open at both ends to permit the opposed reciprocable plungers 44 and 46 to engage the respective adjustors 41, which in turn engage the ends of the brake shoes. In order to centralize the shoe actuating mechanism with respect to the support member 14, it is preferred that the axis of the tangential bore 42 lie in the plane of the flat center portion of the support member.

Because it is particularly convenient to use the casings 22 and 24 as anchors for the shoes, as well as housings for the actuating mechanism, internally extending anchor flanges 48 and 50 are provided as integral parts of the casing wall, in order that the plungers 44 and 46 will seat against said anchor flanges when in released position and will transmit the braking torque through the anchor flanges to the casing and thence to the support member 14 during operation of the brake.

Intersecting bore 42 between the anchor flanges 48 and 50 is a cross-bore 52, which is preferably on an axis substantially parallel to the axis of the brake drum.

The plungers 44 and 46 each have reduced diameter inner extensions 54 which project into the space provided by the intersecting bore 52. Each extension 54 has a deep slot 56 cut into it from its inner end, in order to provide space for a roller 58 which is carried by a pin 60, the pin being journaled in the crescent-shaped sides of the plunger extension. The pin 60 and roller 58 constitute means for reducing the operating friction between the plungers, on the one hand, and the plunger-spreading-means on the other hand. Reduction of the operating friction is important because it provides an appreciable increase in the efficiency of the brake.

Extending laterally from each casing is a hollow externally threaded boss 62, which is on the same axis as the bore 52 and forms a continuation of the open end of said bore, the other end of bore 52 being enclosed by a wall 64. The externally threaded boss 62 provides a support for a fluid pressure cylinder 66. The fluid pressure cylinder 66 may be constituted by a cup-shaped stamping which is provided with an inlet port 68, and an annular cover 70 having an integral internally threaded sleeve 72 which is screwed on the externally threaded boss 62 to provide support for the fluid pressure cylinder 66. The fluid pressure cylinder shown in Figures 1 to 3 is intended to be actuated by air under superatmospheric pressure, the air chamber 74 being connected through port 68 and conduit 76 to a source of air under pressure.

Reciprocable in fluid pressure cylinder 66 is a piston 78 which is subjected on one side to the pressure prevailing in chamber 74, and which is provided at its other side with a groove or depression 80 having a spherical bottom surface. The piston 78 is provided with a suitable annular seal 82 which prevents fluid communication between chamber 74 and chamber 84 located between the piston and the cover 70.

Force is transmitted from piston 78 to plungers 44 and 46 by means of a thrust-transmitting-member or rod 86, which is provided at one end with a spherical surface 88 which engages the bottom of recess 80 formed in piston 78. The other end of thrust transmitting member 86 is constituted by a wedge-shaped portion 90, the opposite sides of which engage the rollers 58. As shown, the wedge-shaped portion 90 of thrust transmitting member 86, extends into the slots 56 provided in the inner ends of the opposed plungers, thus permitting the wedge to be guided by said plungers.

The thrust transmitting member 86 is urged toward released position by a spring 92 which is compressed between a shoulder 94 of the casing and a collar 96 carried by the thrust transmitting member, the collar being held in place by a cotter pin 98.

When the fluid pressure cylinder 66 is assembled to the respective casing 22 or 24 by screwing sleeve 72 onto boss 62, adjustability to compensate for manufacturing tolerances is provided by the threaded connection between the two members. In other words, the cylinder sleeve can be turned down on the boss until the parts are all in the proper relative positions, with the thrust transmitting member engaging the piston 78 at one end and the rollers 58 at the other end. A relatively thick rubber gasket 100 is compressed between sleeve 72 of the cylinder and the wall of the casing, and serves the three-fold purpose of sealing the threaded connection, providing a compressible member which will permit variation in the relative positions of the sleeve and boss, and exerting (due to its resilience) a pressure on the threads which tends to prevent rotation of the cylinder due to vibration or jarring.

In order to provide lubrication of the mechanical parts of the actuating mechanism, including particularly the plungers 44 and 46, and the rollers and pins, we provide a body of lubricating fluid 102 in chamber 84, some of which fluid is forced (with each stroke of piston 78) through the openings 104 in metal cap 106 into the interior of bores 52 and 42. Leakage of the lubricating fluid past plungers 44 and 46 is prevented by means of annular sealing members 108. In order to vent the interior of the actuating device, a breather 110 is provided, made of a porous material which permits venting while at the same time it prevents dirt from entering the interior of the actuating device.

Although it is believed that the operation of the brake is obvious from the foregoing description, a brief summary may be in order. When air under pressure is admitted to chamber 74, piston 78 moves toward the opposite side of the fluid pressure cylinder, exerting a thrust on member 86 which moves the wedge 90 longitudinally in chamber 52, bringing an increasingly wider portion of the wedge between the rollers 58. A separating force is thus exerted on the rollers and this force is transmitted through the pins 60 to the plungers 44 and 46, moving the plungers outwardly and forcing the ends of the shoes into engagement with the rotating drum. Because a force is exerted simultaneously on both ends of both shoes, the shoes will be moved bodily into contact with the drum. However, the frictional engagement between the shoes and the drum develops a wrapping effect which tends to carry the shoes with the drum until they reach anchored position against the respective anchor flange. Inasmuch as one plunger will be in its innermost, or anchored, position during the brake application, while the opposite plunger will be in its outermost position, it is necessary for the wedge 90 to move laterally in order to continue to exert applying force on the unanchored plunger. This is provided for by the spherical engaging surfaces 80 and 88, which permit sufficient pivotal movement of thrust transmitting member 86 to allow for the required lateral movement of the wedge (as seen in Figures 1 to 3 the lateral movement of the wedge corresponds to vertical movement).

When it is desired to release the brakes, chamber 74 is connected through the conventional control valve to an exhaust port, which reduces the operating pressure of the fluid, thereby permitting return springs 38 and 40 to move the shoes to retracted position and permitting spring 92 to move thrust transmitting member 86 and piston 78 to released position.

From the foregoing, it will be apparent that a relatively simple and compact actuating mechanism is provided, which has several important advantages over constructions heretofore suggested. The fluid pressure cylinder is spaced from the center of the brake assembly, and therefore is subjected to less of the brake heat and to more of the cooling flow of air than the usual brake cylinder. Furthermore, a readily removable wedge member is utilized as a shoe spreading element, which member can be easily replaced by a wedge having a greater or lesser angle and therefore having different operating characteristics. This feature will be discussed more fully during the description of Figures 6 to 8, inclusive. Another advantage of the present arrangement is the provision of a brake actuating mechanism which is well adapted to be operated by air pressure cylinders, but which is so arranged that the air pressure cylinders may be removed and hydraulic cylinders substituted. This feature also will be discussed more fully in subsequent paragraphs.

Figure 4:
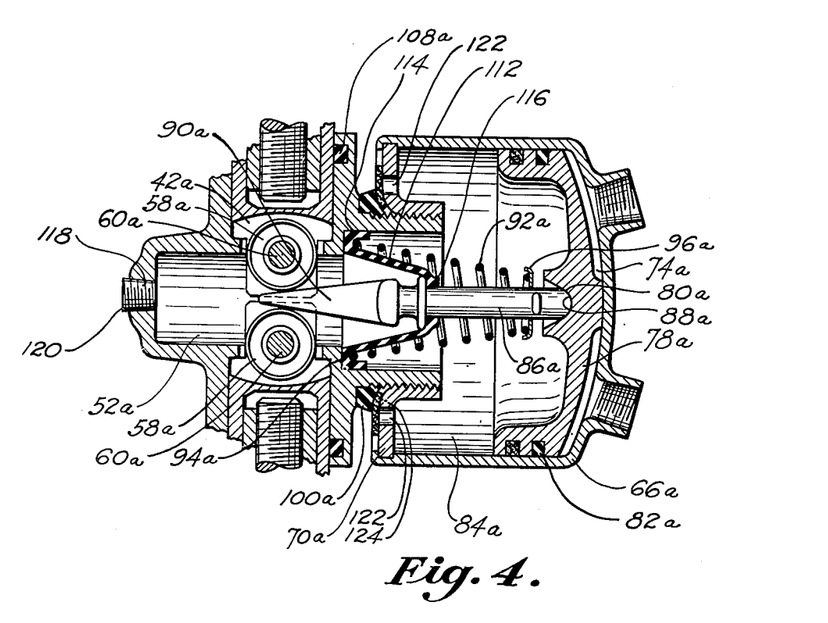
Figure 4 is a sectional view of a brake actuator which illustrates a slightly different construction from that shown in Figures 1 to 3.

Referring to Figure 4, it will be seen that chamber 84a of power cylinder 66a is isolated from the interior of bores 52a and 42a by means of a sealing element 112 which is constituted by an annular resilient rubber boot having its peripheral portion 114 in contact with the shoulder 94a of the casing, and having its inner diameter portion 116 embracing the body of thrust transmitting member 86a. There is no lubricating fluid in chamber 84a, the fluid being admitted to bores 52a and 42a by means of a port 118, which is normally closed by a plug 120. In this construction chamber 84a is vented by openings 122, which are covered by porous material 124, said porous material being located between the end wall 70a of the fluid pressure cylinder and the rubber gasket 100a. Aside from the foregoing features, the actuating device of Figure 4 is substantially similar in construction to that of Figures 1 to 3, and operation of device of Figure 4 is accomplished in the same way as operation of the previously described brake actuator. It will be noted that elements shown in Figure 4 which are functionally similar to elements heretofore described in Figures 1 to 3 have been given the same reference numerals as the corresponding elements in Figures 1 to 3 except that the letter "a" has been added.

Figure 5:
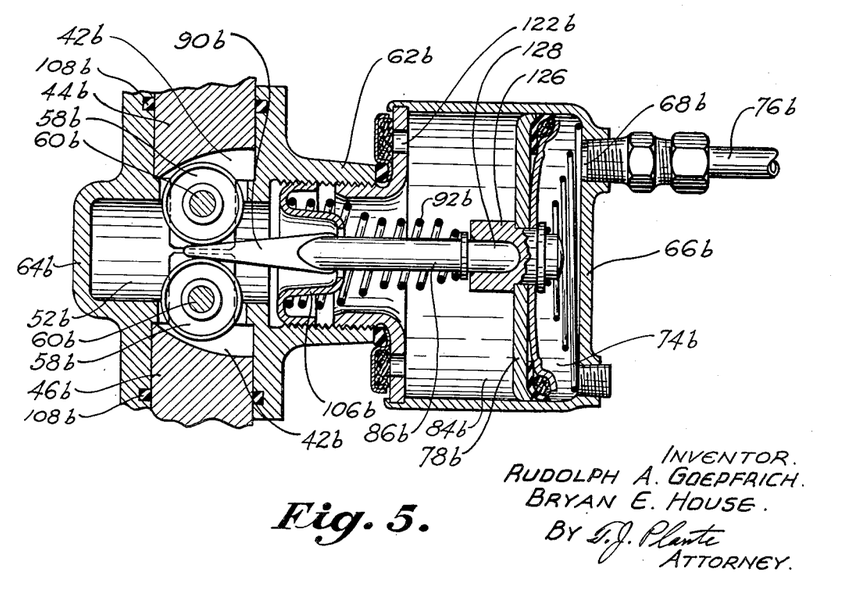
Figure 5 is a sectional view showing another version of our improved brake actuator, wherein the piston of the fluid pressure cylinder is permitted to have a rocking or swiveling action to allow lateral movement of the wedge-shaped shoe spreading member.

Figure 5 shows a somewhat different version of the actuating devices previously described, in which the piston 78b of the fluid pressure cylinder 66b has a relatively narrow bearing contact with the wall of the cylinder, to permit a slight rocking or swiveling movement of the piston 78b, in order to allow lateral (vertical) movement of the thrust transmitting member 86b and its wedge-shaped portion 90b.

The outer end of thrust transmitting member 86b is connected to piston 78b by means of a telescoping connection which does not of itself permit pivotal movement of the wedge. The telescoping connection is provided by a sleeve 126 which is secured to piston 78b and which receives the complementary end portion 128 of thrust transmitting member 86b. In connection with Figure 5, it will be noted that elements having the same functions as similar elements of preceding figures have been given the same numbers as the corresponding elements of the preceding figures except for the addition of the letter "b."

Figure 5 also differs from the preceding figures in having the hollow boss 62b internally threaded, rather than externally threaded, as in the other views.

Figure 6:
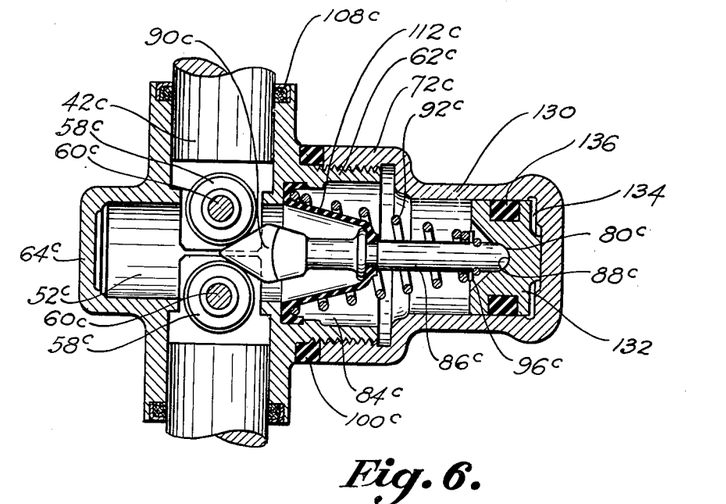
Figure 6 is a sectional view showing still another embodiment of the invention in which the piston of the fluid pressure cylinder is actuated hydraulically rather than by air pressure, and in which a wedge is used having a relatively large angle.
Figure 7:
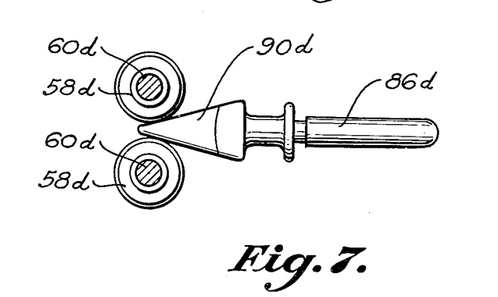
Figures 7 and 8 show wedges having medium and small angles, respectively, which might replace the wedge shown in Figure 6.
Figure 8:
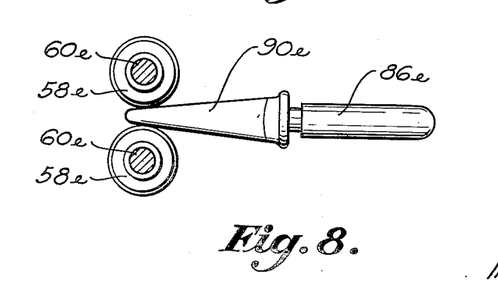

Figures 6 to 8, inclusive, illustrate two important features of our invention. First of all, in place of the air actuated fluid pressure cylinders of the preceding figures, a hydraulic cylinder 130 is shown secured to the boss 62c which extends laterally from the casing which houses the plungers and rollers 58c. The flange 72c, which is screwed onto boss 62c, has a larger diameter than the cylinder 130, because of the relatively smaller piston surface required to obtain operating force equal to that of an air pressure operated actuator. The piston 132, which reciprocates in hydraulic cylinder 130, is subjected to the pressure of liquid in chamber 134 (suitably connected to a pressure source) and is provided with an annular sealing member 136. It will be obvious that the hydraulic cylinders and air-pressure cylinders can be readily interchanged, according to the needs of a given brake installation, without requiring any change in the construction of the plunger housing or of its boss 62c. As in the descriptions of other devices, the numbers applied to the elements of Figure 6 have been the same as those applied to corresponding elements of preceding figures except that the letter "c" has been used as a subscript.

Figures 6 to 8 also illustrate graphically the possibility of substituting wedges having different angles to obtain the desired operating characteristics for different brake installations without requiring modification of the other components of the actuating devices. The wedge 90c of Figure 6 is a 60° wedge, i. e. it has a 60° angle included between the edges which contact the opposed rollers. A wedge having a large angle such as that shown in Figure 6, is useful in a brake installation where a relatively great travel of the shoes is required, and where there is a relatively low ratio between the force acting against the shoes and the force acting against the fluid pressure operating piston, either because the force against the shoes need not be particularly great, or because a relatively high unit pressure is available in the fluid lines.

Figure 7 illustrates a wedge 90d having an included angle of 30°, or in other words, a 30° wedge. A wedge of this size will require greater longitudinal movement for a given spreading movement of the rollers than the wedge 90c of Figure 6. However, the wedge 90d of Figure 7, having a given actuating force applied through thrust transmitting member 86d, will exert a greater outward force through the rollers than the wedge 90c of Figure 6.

Figure 7 illustrates a wedge 90e which has an included angle of 12°, in other words, a 12° wedge. The wedge 90e of Figure 8 will require greater longitudinal travel in order to obtain a given amount of outward movement of the rollers than will the wedge 90d of Figure 7. On the other hand, a given actuating force acting through thrust transmitting member 86e and wedge 90e will result in a greater outward force against the shoes than would the same actuating force acting through wedge 90d of Figure 7.

The ease with which different sizes of wedges can be changed, and the ease with which hydraulic actuation can be substituted for air actuation make our brake actuator outstandingly adaptable to all types of brake installations and therefore permit relatively low tooling costs for a wide variety of brake sizes and types.

Figure 9:
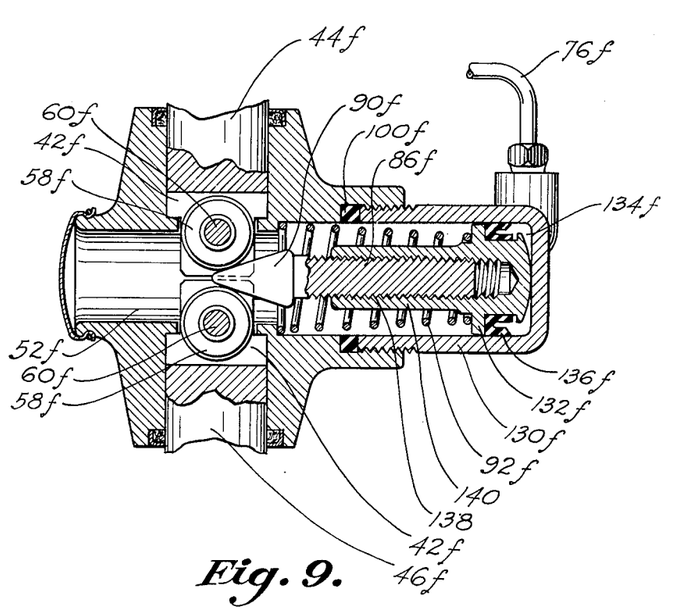
Figure 9 is a sectional view showing a further modification of our invention in which the wedge is connected to the fluid pressure actuated piston by means of a threaded connection, the piston being rockable to permit lateral movement of the wedge.

Figure 9 illustrates a different method of connecting the thrust transmitting member to the piston. In this version, the thrust transmitting member 86f, which carries the wedge 90f, is provided with threads 138 by means of which it is screwed into an internally threaded sleeve 140 which is integral with the hydraulically operated piston 132f. As in the case of piston 78b of Figure 5, piston 132f of Figure 9 has a relatively narrow peripheral bearing contact with the wall of cylinder 130f, thus permitting piston 132f to rock or swivel within the cylinder and allowing lateral (vertical) movement of wedge 90f. Thrust transmitting member 86f may be easily removed by unscrewing it from sleeve 140, and replacement member may then be inserted in the sleeve.

Although certain particular embodiments of our invention have been described, it will be understood by those skilled in the art that the objects of the invention may be attained by the use of constructions different in certain respects from those disclosed without departing from the underlying principles of the invention. We therefore desire by the following claims to include within the scope of our invention all such variations and modifications by which substantially the results of our invention may be obtained through the use of substantially the same or equivalent means.

We claim:

1. For use in cooperation with a rotatable brake drum, a brake comprising a support member having a substantially flat portion lying in a plane perpendicular to the axis of the drum, said support member being secured to a non-rotatable element, two T-section shoes carried by the support member and having their webs lying in the plane of the "substantially flat" portion thereof, each of said shoes being individually shiftable to anchor at either end depending upon the direction of drum rotation, and two actuators carried by the support member and mounted between the ends of the shoes at opposite sides of the brake assembly, each of said actuators having a tangentially extending bore lying on an axis which is located in the plane of the "substantially flat" portion of the support member, each of said actuators further including two oppositely disposed plungers reciprocable in said bore and a wedge member operatively connected to said plungers, said plungers being operatively connected to the ends of the shoes and said wedge member being movable along a line substantially parallel to the axis of the drum to spread said plungers and urge the shoes toward the brake drum, and two fluid pressure cylinders each secured to one of the aforesaid actuators, and each having a fluid pressure responsive piston operatively connected to the respective wedge member and reciprocable along a line parallel to the axis of the drum.

2. In a brake which includes a non-rotatable support member and friction means mounted on the support member having adjacent separable ends which serve either as toe ends or as heel ends depending upon the direction of drum rotation, combined actuating and anchoring mechanism for said friction means comprising a casing which is carried by the support member and which is provided with a first bore having a tangentially extending axis and a second bore intersecting the first bore having an axis parallel to the axis of the brake, said first bore being open at both ends and having two inwardly extending anchor flanges formed integrally with the casing and located on opposite sides of said second bore, said second bore being open at one end only, said casing having a hollow threaded boss which provides a continuation of the open end of said second bore, two oppositely disposed plungers reciprocable in said first bore and operatively connected to the ends of the friction means, each of said plungers having a surface which engages one of the anchor flanges when in released position or when anchored under the influence of braking torque, said plungers having reduced diameter inner portions which extend into said second bore and each of which is provided with a slot, friction reducing means associated with the inner end of each plunger comprising a pin journaled in the plunger extension and a roller carried by the pin and located within the slot, a thrust-transmitting member which is adapted to move longitudinally in said second bore and which has a wedge-shaped portion extending between and engaging the opposed rollers and a spherical contact surface at its opposite end, the wedge portion extending into the slots in which the rollers are located and being guided thereby, a fluid pressure cylinder closed at one end except for fluid porting and provided at the other end with a threaded sleeve which engages the threaded boss of the aforesaid casing, a piston reciprocable in said cylinder, the outer surface of which is adapted to be acted on by fluid under pressure, and the inner surface of which is provided with a recess having a spherical bottom surface which engages the spherical end surface of the thrust-transmitting member, a collar carried by said thrust-transmitting member, and a spring compressed between a surface provided on the aforesaid casing and the collar to urge the thrust-transmitting member and piston toward released position.

3. In a brake which includes a non-rotatable support member and friction means mounted on the support member having adjacent separable ends which serve either as toe ends or as heel ends depending upon the direction of drum rotation, combined actuating and anchoring mechanism for said friction means comprising a casing which is carried by the support member and which is provided with a first bore having a tangentially extending axis and a second bore intersecting the first bore having an axis parallel to the axis of the brake, said first bore being open at both ends and having two inwardly extending anchor flanges formed integrally with the casing and located on opposite sides of said second bore, said second bore being open at one end only, said casing having a hollow threaded boss which provides a continuation of the open end of said second bore, two oppositely disposed plungers reciprocable in said first bore and operatively connected to the ends of the friction means, each of said plungers having a surface which engages one of the anchor flanges when in released position or when anchored under the influence of braking torque, friction reducing means associated with the inner end of each plunger comprising a pin journaled in the plunger and a roller carried by the pin, a thrust-transmitting member which is adapted to move longitudinally in said second bore and which has a wedge-shaped portion extending between and engaging the opposed rollers and a spherical contact surface at its opposite end, a fluid pressure cylinder closed at one end except for fluid porting and provided at the other end with a threaded sleeve which engages the threaded boss of the aforesaid casing, a piston reciprocable in said cylinder, the outer surface of which is adapted to be acted on by fluid under pressure, and the inner surface of which is provided with a recess having a spherical bottom surface which engages the spherical end surface of the thrust-transmitting member, a collar carried by said thrust-transmitting member, and a spring compressed between a surface provided on the aforesaid casing and the collar to urge the thrust-transmitting member and piston toward released position.

4. In a brake which includes a non-rotatable support member and friction means mounted on the support member having adjacent separable ends which serve either as toe ends or as heel ends depending upon the direction of drum rotation, combined actuating and anchoring mechanism for said friction means comprising a casing which is carried by the support member, and which is provided with a first bore having a tangentially extending axis and a second bore intersecting the first bore having an axis parallel to the axis of the brake, said first bore being open at both ends and having two inwardly extending anchor flanges formed integrally with the casing and located on opposite sides of said second bore, said second bore being open at one end, said casing having a hollow threaded boss which provides a continuation of the open end of said second bore, two oppositely disposed plungers reciprocable in said first bore and operatively connected to the ends of the friction means, each of said plungers having a surface which engages one of the anchor flanges when in released position or when anchored under the influence of braking torque, friction reducing means associated with the inner end of each plunger comprising a pin journaled in the plunger and a roller carried by the pin, a thrust-transmitting member which is adapted to move longitudinally in said second bore and which has a wedge-shaped portion extending between and engaging the opposed rollers and a spherical contact surface at its opposite end, a fluid pressure cylinder closed at one end except for fluid porting and provided at the other end with a threaded sleeve which engages the threaded boss of the aforesaid casing, a piston reciprocable in said cylinder, the outer surface of which is adapted to be acted on by fluid under pressure, and the inner surface of which is provided with a recess having a spherical bottom surface which engages the spherical end surface of the thrust-transmitting member, and resilient means acting on the thrust-transmitting member to urge said member and the piston toward released position.

5. In a brake which includes a non-rotatable support member and friction means mounted on the support member having adjacent separable ends, actuating mechanism for said friction means comprising a casing which is carried by the support member, two plungers reciprocable in said casing and operatively connected to the ends of the friction means, a thrust-transmitting member which is provided with a wedge-shaped portion extending between and operatively connected to said plungers, a fluid pressure cylinder which is secured to the aforesaid casing, a pressure responsive member reciprocable in said cylinder which is operatively connected to the thrust-transmitting member, an apertured cap surrounding said thrust-transmitting member and lying between said pressure responsive member and said casing, and a quantity of lubricating fluid located in the space between said pressure responsive member and said cap, movement of said pressure responsive member toward said casing causing some of said lubricating fluid to splash into the space between the aforesaid plungers.

6. In a brake which includes a non-rotatable support member and friction means mounted on the support member having adjacent separable ends, combined actuating and anchoring mechanism for said friction means comprising a casing which is carried by the support member and which is provided with a first bore and a second bore intersecting the first bore, said first bore being open at both ends and having two inwardly extending anchor flanges formed integrally with the casing and located on opposite sides of said second bore, said second bore being open at one end only, two oppositely disposed plungers reciprocable in said first bore and operatively connected to the ends of the friction means, each of said plungers having a surface which engages one of the anchor flanges when in released position or when anchored under the influence of braking torque, said plungers having reduced diameter inner portions which extend into said second bore and each of which is provided with two cross-slots lying in planes perpendicular to one another, friction reducing means associated with each plunger comprising a pin journaled in the bottom of one of the cross-slots and a roller carried by the pin and located within the other cross-slot, and a thrust-transmitting member which is adapted to move longitudinally in said second bore and which is provided wih a wedge-shaped portion extending between and engaging the opposed rollers, the wedge portion extending into the slots in which the rollers are located and being guided thereby.

7. In a brake which includes a non-rotatable support member and friction means mounted on the support member having adjacent separable ends which serve either as toe ends or as heel ends depending upon the direction of drum rotation, combined actuating and anchoring mechanism for said friction means comprising a casing which is carried by the support member and which is provided with a first bore having a tangentially extending axis and a second bore intersecting the first bore having an axis parallel to the axis of the brake, said first bore being open at both ends and having two inwardly extending anchor flanges formed integrally with the casing and located on opposite sides of said second bore, said second bore being open at one end only, said casing having a hollow threaded boss which provides a continuation of the open end of said second bore, two oppositely disposed plungers reciprocable in said first bore and operatively connected to the ends of the friction means, each of said plungers having a surface which engages one of the anchor flanges when in released position or when anchored under the influence of braking torque, said plungers having reduced diameter inner portions which extend into said second bore, friction reducing means associated with the inner end of each plunger, a thrust-transmitting member which is adapted to move longitudinally in said second bore and which has at one end a wedge-shaped portion extending between and engaging the opposed friction reducing means and at the other end a spherical contact surface, a fluid pressure cylinder closed at one end except for fluid porting and provided at the other end with a threaded sleeve which engages the threaded boss of the aforesaid casing, a piston reciprocable in said cylinder, the outer surface of which is adapted to be acted on by fluid under pressure, and the inner surface of which is provided with a recess having a spherical bottom surface which engages the spherical end surface of the thrust-transmitting member, a collar carried by said thrust-transmitting member, and a spring compressed between a surface provided on the aforesaid casing and the collar to urge the thrust-transmitting member and piston toward released position.

8. In a brake which includes a non-rotatable support member and friction means mounted on the support member having adjacent separable ends which serve either as toe ends or as heel ends depending upon the direction of drum rotation, combined actuating and anchoring mechanism for said friction means comprising a casing which is carried by the support member and which is provided with a first bore having a tangentially extending axis and a second bore intersecting the first bore having an axis parallel to the axis of the brake, said first bore being open at both ends and having two inwardly extending anchor flanges formed integrally with the casing and located on opposite sides of said second bore, said second bore being open at one end, said casing having a hollow threaded boss which provides a continuation of the open end of said second bore, two oppositely disposed plungers reciprocable in said first bore and operatively connected to the ends of the friction means, each of said plungers having a surface which engages one of the anchor flanges when in released position or when anchored under the influence of braking torque, friction reducing means associated with the inner end of each plunger, a thrust-transmitting member which is adapted to move longitudinally in said second bore and which has at one end a wedge-shaped portion extending between and engaging the opposed friction reducing means and at the other end a spherical contact surface, a fluid pressure cylinder closed at one end except for fluid porting and provided at the other end with a threaded sleeve which engages the threaded boss of the aforesaid casing, a piston reciprocable in said cylinder, the outer surface of which is adapted to be acted on by fluid under pressure, and the inner surface of which is provided with a recess having a spherical bottom surface which engages the spherical end surface of the thrust-transmitting member, and resilient means acting on the thrust-transmitting member to urge said member and the piston toward released position.

9. For use in cooperation with a rotatable brake drum, a brake comprising a support member having a substantially flat portion lying in a plane perpendicular to the axis of the drum, said support member being secured to a non-rotatable element, friction means carried by the support member and lying in the plane of the "substantially flat" portion thereof, and an actuator carried by the support member between the ends of the friction means, said actuator having a tangentially extending bore lying on an axis which is located in the plane of the "substantially flat" portion of the support member, said actuator further including two oppositely disposed plungers reciprocable in said bore and a wedge member operatively connected to said plungers, said plungers being operatively connected to the ends of said friction means and said wedge member being movable along a line substantially parallel to the axis of the drum to spread said plungers and urge the shoes toward the brake drum.

10. For use in cooperation with a rotatable brake drum, a brake comprising a support member having a substantially flat portion lying in a plane perpendicular to the axis of the drum, said support member being secured to a non-rotatable element, friction means carried by the support member and lying in the plane of the "substantially flat" portion thereof, and an actuator carried by the support member between the ends of the friction means, said actuator having a tangentially extending bore lying on an axis which is located in the plane of the "substantially flat" portion of the support member, said actuator further including two oppositely disposed plungers reciprocable in said bore and a wedge member operatively connected to said plungers, said plungers being operatively connected to the ends of said friction means and said wedge member being movable along a line substantially parallel to the axis of the drum to spread said plungers and urge the shoes toward the brake drum, and a fluid pressure cylinder secured to the aforesaid actuator, and having a fluid pressure responsive piston operatively connected to the respective wedge member and reciprocable along a line parallel to the axis of the drum.

11. In a brake which includes a non-rotatable support member and friction means mounted on the support member having adjacent separable ends, combined actuating and anchoring mechanism for said friction means comprising a casing which is carried by the support member and which is provided with a first bore and a second bore intersecting the first bore, said first bore being open at both ends and having two inwardly extending anchor flanges formed integrally with the casing and located on opposite sides of said second bore, said second bore being open at one end only, two oppositely disposed plungers reciprocable in said first bore and operatively connected to the ends of the friction means, each of said plungers having a surface which engages one of the anchor flanges when in released position or when anchored under the influence of braking torque, friction reducing means associated with each plunger, and a thrust-transmitting member which is adapted to move longitudinally in said second bore and which is provided with a wedge-shaped portion extending between and engaging said friction reducing means.

12. In a brake which includes a non-rotatable support member and friction means mounted on the support member having adjacent separable ends, combined actuating and anchoring mechanism for said friction means comprising a casing which is carried by the support member and which is provided with a first bore and a second bore intersecting the first bore, said first bore being open at both ends, said second bore being open at one end only, two oppositely disposed plungers reciprocable in said first bore and operatively connected to the ends of the friction means, said plungers having reduced diameter inner portions which extend into said second bore, and each of said reduced diameter portions being provided with two cross-slots lying in planes perpendicular to one another, friction reducing means associated with each plunger comprising a pin journaled in the bottom of one of the cross-slots and a roller carried by the pin and located within the other cross-slot, and a thrust-transmitting member which is adapted to move longitudinally in said second bore and which is provided with a wedge-shaped portion extending between and engaging the opposed rollers, the wedge portion extending into the slots in which the rollers are located and being guided thereby.

RUDOLPH A. GOEPFRICH.
BRYAN E. HOUSE.

REFERENCES CITED

The following references are of record in the file of this patent:

UNITED STATES PATENTS

| Number | Name | Date |
| --- | --- | --- |
| 454,360 | Keene | June 16, 1891 |
| 1,120,302 | Gaulin et al. | Dec. 8, 1914 |
| 1,565,492 | Ohl | Dec. 15, 1925 |
| 1,968,667 | White | July 31, 1934 |
| 2,148,240 | LaBrie | Feb. 21, 1939 |
| 2,351,040 | Hawley | June 13, 1944 |
| 2,376,686 | Goepfrich | May 22, 1945 |
| 2,418,818 | Perrot | Apr. 15, 1947 |

FOREIGN PATENTS

| Number | Country | Date |
| --- | --- | --- |
| 453,170 | Great Britain | Sept. 7, 1936 |
| 513,666 | Great Britain | Oct. 18, 1939 |
| 538,335 | Great Britain | July 29, 1941 |